June 16, 1936.   G. M. BELLANCA   2,043,980
FUSELAGE CONSTRUCTION
Filed April 11, 1933
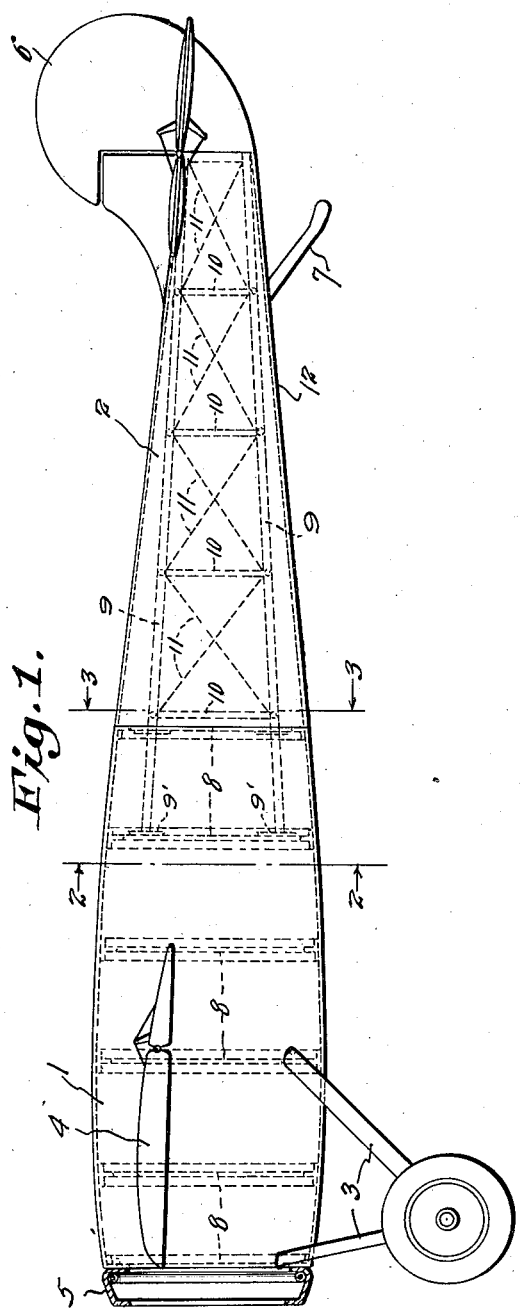
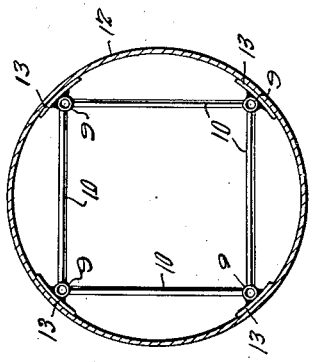
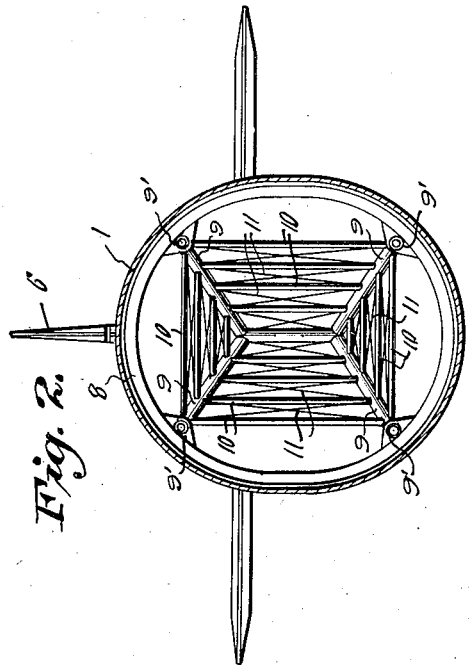
Inventor
Giuseppe M. Bellanca
By Semmes & Semmes
Attorneys Patented June 16, 1936

2,043,980

UNITED STATES PATENT OFFICE 2,043,980

FUSELAGE CONSTRUCTION

Giuseppe M. Bellanca, New Castle, Del.

Application April 11, 1933, Serial No. 665,585

1 Claim. (Cl. 244—30)

This invention relates to airplanes, and more particularly to an improved type of fuselage for aircraft.

In the past two main types of fuselages have been employed, the monocoque and the truss type. Each of these present advantages. The monocoque type of fuselage is characterized by a relatively lower resistance than any other form and is, therefore, largely employed on fast machines. This advantage of the monocoque is offset, in the commercial field, by the fact that it is rather expensive and difficult to construct. The monocoque type of fuselage has been made up using both the ply-wood and the metal skin. The truss type of fuselage is more common. This comprises essentially a plurality of longéron members extending the full length of the fuselage, with which are associated compression and tension members, the whole forming a truss construction. The truss type of fuselage has been made up in which the longérons and certain of the larger bracing members have been made of metal, as well as wood.

In each type the forward portion of the fuselage which is subjected to the greatest weight and stress is made of a more rugged construction than the rear portion.

An object of the present invention is to provide a novel type of fuselage.

Another object is to provide a fuselage which combines the advantages of the monocoque and truss type of structure.

A further object is to provide a fuselage construction which is particularly amenable to large scale and rapid production.

A still further object is to provide a fuselage which is made up in standardized sections of relatively different character.

With these and other equally important objects in view, the invention comprehends the concept of providing a composite type of fuselage which includes monocoque and truss sections adapted to be joined together to form a complete fuselage of improved characteristics. In order to enable a more ready comprehension of the invention a physical embodiment is shown in the accompanying drawing, in which:

Figure 1 is a side elevation of the fuselage.

Figs. 2 and 3 are cross sections taken on lines 2—2 and 3—3 respectively of Fig. 1.

As indicated hereinbefore, fuselages of entire monocoque structure have been employed. In this type both the metal and the ply-wood skin have been utilized. The ply-wood type is somewhat difficult of construction. When such plywood is employed care should be taken to eliminate the danger of wrinkling and buckling. In order to avoid this a special type of ply-wood is usually employed in which the core bears a special relationship to the skin laminations in respect both of the material and the direction of the grain. Usually in such ply-wood monocoque constructions the portion at the forward end of the fuselage is made thicker and stronger than that of the tail, since the bending moments increase rapidly in the forward part of the fuselage. Therefore, as a general rule, more plys are used in the forward portion of the fuselage extending from the engine bed to an area in the rear of the cockpit. Thus in many cases the rear portion of the monocoque fuselage is made of a three-ply material and the forward section of five-ply.

Now in accordance with the present invention the advantages of the monocoque and the truss type can be combined in the one plane. As shown in Fig. 1, the broad concept of the invention comprehends the utilization of a monocoque section 1 at the forward part of the plane and the truss section 2 at the rear part. The monocoque section mounts the landing gear 3 and carries the main sustention surfaces 4. The monocoque section likewise carries the engine mounting, shown as the engine ring 5. As a typical construction the truss tail portion carries the empennage 6 and the tail skid or landing wheel 7.

The monocoque section employed herein may be constructed entirely of metal or may be formed with a ply-wood skin. It will immediately be appreciated that in the event ply-wood skin is employed, since the monocoque section is utilized only in the forward portion of the fuselage, standard ply-wood may be utilized. Thus the forward section 1 may be made of bulkhead and ply-wood construction in which the ply-wood is of a given number of laminations, for example five. In the preferred embodiment, however, the monocoque section is made of metal, as shown in the drawing. The skin may comprise a number of metal sections 1' and 1" secured together along the contiguous flanges 8. When the forward or monocoque portion is made up of separate metal sections, the flanges 8 may be of sufficient depth and thickness so as to serve at the one-time as securing means for the next adjacent section and also bulkheads. In subserving this latter function, it will be appreciated that the flanges 8 may be given a special design. For example, such flanges may be of internal perimital formation having deepened or thickened webs on the flanges at any desired portion. Also it will be appreciated that whenever desired increased stiffness and strength may be imparted to the monocoque section by employing compression beams extending as cords between any given portion of the flanges.

In lieu of making up the skin of the monocoque section as separate pieces, this section may be made up of one continuous strip of metal conforming to the desired shape. In this instance there is associated with the metal skin any desired number of interior bulkheads to which the skin is securely attached, as by riveting, or any desirable type of fusion joint.

In some circumstances it may be desired to construct the monocoque section with a ply-wood skin, and such type of construction is herein contemplated. In this event the ply-wood skin is preferably secured to interior bulkheads of suitable strength.

The rear portion of the fuselage, as shown, comprises a truss construction. This includes the longéron members 9 extending from the tail portion of the fuselage well into the monocoque section. In the preferred modification these longérons are cantilevered, as shown at 9', into the monocoque section. In the preferred form of invention in which the monocoque bulkhead portions, whether constituted by the flanges 8 or by separate bulkheads, are of metal, metal longérons are employed in the tail section and these are rigidly secured to the monocoque section, preferably by a fusion joint. It will be seen that by extending the longéron 9 well into the monocoque portion and attaching these rigidly to the monocoque portion through a considerable degree of its length, an eminently strong and rigid construction is secured.

In the tail portion compression members 10 and tension bracing members, such as wires 11, are employed to complete the truss. The tail portion of the fuselage may be covered with any suitable skin, such as the fabric 12, and this may be faired into the monocoque forward portion. To do this a type of false fairing may be built up by attaching the contour members 13 to the longérons 9 at suitable places along the length of the tail section. In this manner the interior fuselage may be given a continuous streamline form.

It will be seen from this type of construction that the forward portion 1 and the rear section 2 may be made up of more or less standardized forms and that these may be secured together to give a composite continuous fuselage. The surface of the fuselage may be readily streamlined by the simple expedient of utilizing false fairing supports 13 of the desired shape and size. It will be appreciated that when the skin of the rear portion 2 is of the dope fabric, thin circumferential forming elements, such as the wooden strips 14, may be employed to give the desired configuration to the skin.

It will be appreciated that this type of composite fuselage presents many advantages. As pointed out above, the bending moments, in the fuselage, increase rapidly at the forward portion. This is because this portion of the fuselage is subjected to the greatest weight, due to the engine and fuel tank and to dynamic stresses. Whereas in the former type of monocoque construction a differential ply-wood structure was employed, the present invention permits the use of standard ply-wood since it is employed only on the forward portion of the plane. Likewise the rear portion of the fuselage, which need not be as rugged as the forward portion, is made up by the simpler and cheaper method of truss construction. This type of construction likewise is particularly useful in the cabin type of plane inasmuch as the utilization of the monocoque cabin permits of the maximum strength with the greatest available space. Due to the inherent great strength of the monocoque construction the utilization of this in the forward part of the fuselage provides an excellent mounting for the major stress taking members, such as the landing wheels and the sustenation surfaces. Longitudinal rigidity is imparted in the present construction by the special cantilever attachment between the forward and the tail sections. By extending the longéron sections 9' well into the monocoque section the bending moments, resulting from the operation of the empennage, are well distributed through the strong monocoque unit.

From a production point of view it will be appreciated that this type of fuselage is a great advantage. The composite structure is eminently strong. It lends itself readily to mass production inasmuch as the tail portion may be made up, for example, in the airplane factory utilizing the usual jigs, while the monocoque section, when made of metal, may be fabricated readily in large quantities at the rolling mill. This tends to maximum efficiency not only in production but in the structural characteristics of the ultimate airplane. By using a standard forward monocoque section fabricated and heat treated under the most ideal conditions and a tail section manufactured by the airplane manufacturer, a wide latitude in design and type of plane is provided. Thus the air plane manufacturer, even with a standard type of monocoque forward or cabin section, may avail himself of any reasonable length of fuselage by adjusting the length of the tail section.

As noted hereinbefore, the fuselages made up in accordance with the present invention may comprise monocoque sections completely of metal, having a single continuous metal skin, or a skin made up of a plurality of sections with fused or riveted abutting flanges. In the preferred form of invention the metal skin of the monocoque is of some light weight, high strength, non-ferrous alloy, such as heat treated alloys of the duralumin type or suitably protected high strength magnesium alloys. The monocoque section, however, may be made up with a ply-wood skin and with wood and/or metal bulkheads. The tail portion, while preferably constructed of metal longérons, such for example as chrome-molybdenum tubing and compression members of smaller construction, may nevertheless be fabricated of wood. It will thus be seen that the invention provides not only for an improved type of fuselage, but one in which a wide permissive range of design and construction is available.

While a preferred embodiment of the invention has been described, it will be understood that this is given largely as exemplifying the principles of the invention and not as a restrictive permissive type of construction. The invention, therefore, is intended not to be limited to the constructions shown and described except as such limitations are clearly imposed by the appended claim.

I claim:

An airplane fuselage comprising a forward monocoque section including a plurality of respectively joined cylindrical sections of metal and a tail section comprising a plurality of metal longéron members extending the length of the truss section and projecting exteriorly of said truss section and being adapted to be attached to a plurality of the metal sections.

GIUSEPPE M. BELLANCA.